United States Patent
Cherpeck

[11] Patent Number: 5,916,825
[45] Date of Patent: Jun. 29, 1999

[54] POLYISOBUTANYL SUCCINIMIDES AND FUEL COMPOSITIONS CONTAINING THE SAME

[75] Inventor: Richard E. Cherpeck, Cotati, Calif.

[73] Assignee: Chevron Chemical Company LLC, San Francisco, Calif.

[21] Appl. No.: 09/141,636

[22] Filed: Aug. 28, 1998

[51] Int. Cl.[6] .................................. C10L 1/18; C10L 1/22
[52] U.S. Cl. ............................................. 44/347; 548/545
[58] Field of Search ................................. 44/347; 548/545

[56] References Cited

U.S. PATENT DOCUMENTS

| | | | |
|---|---|---|---|
| 4,039,300 | 8/1977 | Chloupeck et al. | 44/58 |
| 4,240,803 | 12/1980 | Andress, Jr. | 44/63 |
| 5,112,507 | 5/1992 | Harrison | 508/291 |
| 5,393,309 | 2/1995 | Cherpeck | 44/347 |
| 5,588,973 | 12/1996 | Blackboron et al. | 508/291 |
| 5,789,356 | 8/1998 | Tiffany, III | 44/347 |

FOREIGN PATENT DOCUMENTS

| | | |
|---|---|---|
| 376578 | 12/1989 | European Pat. Off. . |
| 565285 | 3/1993 | European Pat. Off. . |
| 1486144 | 9/1977 | United Kingdom . |

*Primary Examiner*—Jacqueline V. Howard
*Attorney, Agent, or Firm*—E. A. Schaal; S. G. K. Lee

[57] ABSTRACT

A compound of the formula:

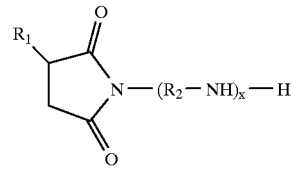

wherein $R_1$ is a polyisobutanyl group derived from a highly reactive polyisobutene having an average molecular weight in the range of from about 500 to 5,000;

$R_2$ is an alkylene group having from about 2 to 6 carbon atoms; and x is an integer from about 1 to 4.

The polyisobutanyl succinimides of the present invention are useful as fuel additives for the prevention and control of engine deposits.

25 Claims, No Drawings

POLYISOBUTANYL SUCCINIMIDES AND FUEL COMPOSITIONS CONTAINING THE SAME

BACKGROUND OF THE INVENTION

1. Field of the Invention

This invention relates to novel polyisobutanyl succinimides and derivatives thereof. In a further aspect, this invention relates to the use of these compounds in fuel compositions to prevent and control engine deposits.

2. Description of the Prior Art

It is well known in the art that liquid hydrocarbon combustion fuels, such as fuel oils and gasolines, tend to exhibit certain deleterious characteristics, either after long periods of storage or under actual operational conditions. Gasolines, for example, in operational use tend to deposit sludge and varnish at various points in the power system, including carburetor and intake valves. It is desirable, therefore, to find a means for improving liquid hydrocarbon fuels by lessening their tendency to leave such deposits.

U.S. Pat. No. 4,240,803 discloses a liquid hydrocarbon fuel composition comprising fuel and a detergent amount of an alkenyl succinimide prepared by reacting an alkenyl succinic acid or anhydride, wherein the alkenyl substituent is derived from a specific mixture of $C_{16}$–$C_{28}$ olefins, with a polyalkylene polyamine. This patent teaches that for unexpected effectiveness as a liquid hydrocarbon detergent, it is essential that the alkenyl group attached to the succinimide be derived from a mixture of $C_{16}$–$C_{28}$ olefins obtained as the "bottoms" product from an olefin oligomerization.

European Patent Application No. 376,578 discloses a three-component additive composition for reducing carbon deposits in internal combustion engines comprising (a) a polyalkylene succinimide, (b) a polyalkylene, and (c) a mineral oil. Also disclosed is a liquid fuel composition containing such additive composition, as well as a method for cleaning a gasoline internal combustion engine utilizing this composition. The sole example disclosed in this European application shows the use of a polyisobutylene succinimide additive in intake valve and carburetor cleanliness tests. However, no mention is made in the example of the type of polyamine used to prepare the succinimide or the molecular weight of the polyisobutylene substituent.

British Patent No. 1,486,144 discloses a gasoline additive composition comprising (a) a hydrocarbyl-substituted succinimide, (b) a polymer of a $C_2$ to $C_6$ unsaturated hydrocarbon, and (c) a paraffinic or naphthenic oil. Example 1 of the British patent discloses a polyisobutylene succinimide, wherein the polyisobutylene group has a molecular weight of about 900 and the imide moiety is derived from diethylene triamine, in combination with a paraffinic oil and about 28 weight percent of polypropylene having a molecular weight of about 800. This British patent further teaches that all three components are essential to achieving a reduction in carbonaceous deposits.

U.S. Pat. No. 4,039,300 discloses a composition for fueling an internal combustion engine equipped with at least one carburetor, which comprises a major amount of hydrocarbons boiling in the gasoline range, a minor amount of at least one detergent and a minor amount of mineral oil of lubricating viscosity comprising at least 50 percent by weight of aromatic hydrocarbons having an average molecular weight of 300 to 700, the detergent and oil being present in amounts sufficient to inhibit formation of deposits on the carburetor. Among the detergents disclosed are polyamino polyalkylene alkenyl succinimides, preferably polyisobutenyl succinimides. Thus, the thrust of this patent is the use of an aromatic-rich mineral oil containing at least 50 percent aromatic hydrocarbons, in combination with known detergent additives.

U.S. Pat. No. 5,393,309 discloses a fuel additive composition comprising a polyisobutenyl succinimide derived from ethylenediamine or diethylenetriamine, wherein the polyisobutenyl group has an average molecular weight of about 1,200 to 1,500 and a nonvolatile paraffinic or naphthenic carrier oil, or mixture thereof Likewise, European Patent Application No. 565,285 discloses a fuel composition comprising a major amount of a liquid hydrocarbon fuel and, in an amount to provide detergency, a polyisobutene succinimide derived from the reaction of a polyisobutene-substituted succinic acylating agent and an amine having at least one reactive hydrogen bonded to an amine nitrogen. The polyisobutene substituent is derived from a highly reactive polyisobutene.

SUMMARY OF THE INVENTION

I have now discovered that certain polyisobutanyl succinimides provide excellent control of engine deposits, especially intake valve deposits, when employed as fuel additives in fuel compositions. The compounds of the present invention include those having the following formula:

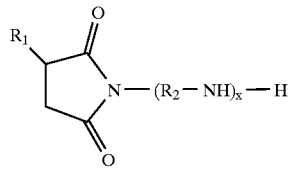

wherein $R_1$ is a polyisobutanyl group derived from a highly reactive polyisobutene and having an average molecular weight in the range of from about 500 to 5,000;

$R_2$ is a straight- or branched-chain alkylene group having from about 2 to 6 carbon atoms; and x is an integer from about 1 to 4.

The present invention further provides a fuel composition comprising a major amount of hydrocarbons boiling in the gasoline or diesel range and a deposit-controlling effective amount of the compound of the present invention.

The present invention is also concerned with a fuel concentrate comprising an inert stable oleophilic organic solvent boiling in the range of from about 150° F. to 400° F. and from about 10 to 50 weight percent of the compound of the present invention.

Among other factors, the present invention is based on the discovery that certain polyisobutanyl succinimides, wherein the polyisobutanyl group is derived from a highly reactive polyisobutene and has an average molecular weight of from about 500 to 5,000, provides excellent control of engine deposits, especially on intake valves, when employed as additives in fuel compositions.

DETAILED DESCRIPTION OF THE INVENTION

The compounds of the present invention are polyisobutanyl succinimides having the following formula:

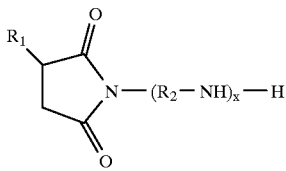

wherein $R_1$, $R_2$, and x are as described above.

Preferably, $R_1$ is a polyisobutanyl group has an average molecular weight in the range of about 500 to 3,000, more preferably about 700 to 3,000, and most preferably about 900 to 2,500.

Preferably, $R_2$ is a straight- or branched-chain alkylene group having from about 2 to 4 carbon atoms. Most preferably, $R_2$ contains about 2 or 3 carbon atoms.

Preferably, x is an integer of about 1 or 2.

Definitions

Prior to discussing the present invention in further detail, the following terms will be defined.

The term "alkyl" refers to both straight- and branched-chain alkyl groups.

The term "lower alkyl" refers to alkyl groups having from about 1 to 6 carbon atoms and includes primary, secondary, and tertiary alkyl groups. Typical lower alkyl groups include, for example, methyl, ethyl, n-propyl, isopropyl, n-butyl, sec-butyl, t-butyl, n-pentyl, n-hexyl, and the like.

The term "polyalkyl" refers to alkyl groups which are generally derived from polyolefins which are polymers or copolymers of mono-olefins, particularly 1-mono-olefins, such as ethylene, propylene, butylene, and the like. Preferably, the mono-olefin employed will have from about 2 to about 24 carbon atoms, and more preferably, about 3 to 12 carbon atoms. More preferred mono-olefins include propylene, butylene, particularly isobutylene, 1-octene, and 1-decene. Polyolefins prepared from such mono-olefins include polypropylene, polybutene, especially polyisobutene, and the polyalphaolefins produced from 1-octene and 1-decene.

The term "highly reactive polyisobutene" refers to a polyisobutene wherein greater than 70% of the residual olefinic double bonds are of the vinylidene type, i.e., represented by the formula:

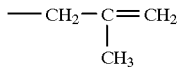

The term "succinimide" is understood in the art to include many of the amide, imide, etc. species that are also formed by the reaction of a succinic anhydride with an amine and is so used herein. The predominant product, however, is succinimide and this term has been generally accepted as meaning the product of a reaction of an alkenyl- or alkyl-substituted succinic acid or anhydride with a polyamine. Alkenyl or alkyl succinimides are disclosed in numerous references and are well known in the art. Certain fundamental types of succinimides and related materials encompassed by the term of art "succinimide" are taught in U.S. Pat. Nos. 2,992,708; 3,018,250; 3,018,291; 3,024,237; 3,100,673; 3,172,892; 3,219,666; 3,272,746; 3,361,673; 3,381,022; 3,912,764; 4,234,435; 4,612,132; 4,747,965; 5,112,507; 5,241,003; 5,266,186; 5,286,799; 5,319,030; 5,334,321; 5,356,552; 5,716,912, the disclosures of which are hereby incorporated by reference.

The term "fuel" or "hydrocarbon fuel" refers to normally liquid hydrocarbons having boiling points in the range of gasoline and diesel fuels.

General Synthetic Procedures

The polyisobutanyl succinimides employed in the present invention are prepared by reducing a polyisobutenyl succinic anhydride followed by reaction with a polyamine as detailed herein. Alternatively, a polyisobutenyl succinic anhydride may be first reacted with a polyamine to yield the polyisobutenyl succinimide, which in turn, may be reduced to the polyisobutanyl succinimides of the present invention.

In general, the polyisobutanyl substituent on the compounds of the present invention will have an average molecular weight in the range of from about 500 to 5,000, preferably about 500 to 3,000, more preferably 700 to 3,000, and most preferably about 900 to 2,500.

The highly reactive polyisobutenes used to prepare the present succinimides are polyisobutenes that comprise at least about 70% of the more reactive methylvinylidene isomer. Suitable polyisobutenes include those prepared using $BF_3$ catalysts. The preparation of such polyisobutenes in which the methylvinylidene isomer comprises a high percentage of the total composition is described in U.S. Pat. Nos. 4,152,499 and 4,605,808. Such polyisobutenes are known in the art as "highly reactive" polyisobutenes.

Examples of suitable polyisobutenes having a high alkylvinylidene content include Ultravis 30, a polyisobutene having a molecular weight of about 1,300 and a methylvinylidene content of about 74%, and Ultravis 10, a polyisobutene having a molecular weight of about 950 and a methylvinylidene content of about 76%, both available from British Petroleum.

Polyisobutenyl succinic anhydrides are well known in the art. Various methods for the preparation of polyisobutenyl succinic anhydrides involving the reaction of a polyisobutene and maleic anhydride have been described. Such methods include a thermal process and a chlorination process. The thermal process is characterized by thermal reaction of a polyisobutene with maleic anhydride, as described, for example, in U.S. Pat. Nos. 3,361,673 and 3,676,089, which are herein incorporated by reference. Alternatively, the chlorination process is characterized by the reaction of a halogenated polyisobutene, such as a chlorinated polyisobutene, with maleic anhydride, as described, for example, in U.S. Pat. No. 3,172,892, which is herein incorporated by reference.

The polyisobutenyl succinic anhydride can be reduced by reaction with a suitable hydrogenation catalyst, such as palladium on carbon, to yield the polyisobutanyl succinic anhydride.

The polyisobutanyl succinimides of the present invention can then be achieved by reacting a polyisobutanyl succinic anhydride with a suitable polyamine as shown in the following reaction.

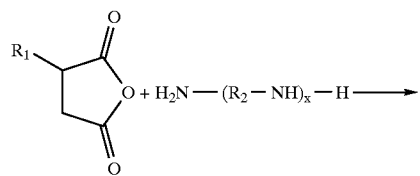

-continued

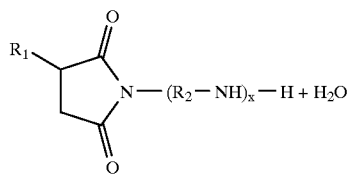

wherein $R_1$, $R_2$, and x are as defined above.

The above reaction will be apparent to those skilled in the art. The reaction of suitable polyamines, such as ethylenediamine or diethylenetriamine, with polyisobutanyl succinic anhydride may be conducted in the absence of solvent, or alternatively, in the presence of an inert solvent, such as toluene, xylene, $C_9$ aromatic hydrocarbons, chloroform, 100 neutral oils, and the like. The reaction is typically conducted at a temperature in the range of from about 80° C. to 200° C.

Reaction temperatures in the range of from about 150° C. to 170° C. are generally preferred.

Particularly suitable polyalkylene polyamines are those having the formula:

$$H_2N\text{—}(R_2\text{—}NH)_x\text{—}H$$

wherein $R_2$ is a straight- or branched-chain alkylene group having from about 2 to 6 carbon atoms, preferably about 2 to 4 carbon atoms, most preferably about 2 carbon atoms, i.e., ethylene ($\text{—}CH_2CH_2\text{—}$); and x is an integer from about 1 to 4, preferably about 1 or 2.

Particularly preferred polyalkylene polyamines are ethylenediamine, diethylenetriamine, triethylenetetraamine, and tetraethylenepentamine. Most preferred are ethylenediamine and diethylenetriamine, especially ethylenediamine.

Many of the polyamines suitable for use in the present invention are commercially available and others may be prepared by methods that are well known in the art. For example, methods for preparing amines and their reactions are detailed in Sidgewick's "*The Organic Chemistry of Nitrogen*", Clarendon Press, Oxford, 1966; Noller's "*Chemistry of Organic Compounds*", Saunders, Philadelphia, 2nd Ed., 1957; and Kirk-Othmer's "*Encyclopedia of Chemical Technology*", 2nd Ed., especially Volume 2, pp. 99–116.

Alternatively, the polyisobutenyl succinic anhydride may be first reacted with the polyamine. The resulting polyisobutenyl succinimide may then be reduced to yield the polyisobutanyl succinimide of the present invention with a suitable hydrogenation catalyst, such as palladium on carbon.

The reaction of a polyamine with an alkenyl or alkyl succinic anhydride to produce a polyamine alkenyl or alkyl succinimide is well known in the art and is described, for example, in U.S. Pat. Nos. 3,018,291; 3,024,237; 3,172,892; 3,219,666; 3,223,495; 3,272,746; 3,361,673; and 3,443,918.

FUEL COMPOSITIONS

The compounds of the present invention are useful as additives in hydrocarbon distillate fuels boiling in the gasoline or diesel range. The proper concentration of additive necessary in order to achieve the desired detergency and dispersancy varies depending upon the type of fuel employed, the presence of other detergents, dispersants, and other additives, etc. Generally, however, from about 50 to 7,500 ppm by weight, preferably from about 300 to 2,500 ppm, of the present additive per part of base fuel is needed to achieve the best results.

The deposit control additive may be formulated as a concentrate, using an inert stable oleophilic organic solvent boiling in the range of from about 150° F. to 400° F. Preferably, an aliphatic or an aromatic hydrocarbon solvent is used, such as benzene, toluene, xylene or higher-boiling aromatics or aromatic thinners. Aliphatic alcohols of from about 3 to 8 carbon atoms, such as isopropanol, isobutylcarbinol, n-butanol, and the like, in combination with hydrocarbon solvents are also suitable for use with the detergent-dispersant additive. In the concentrate, the amount of the present additive will be ordinarily at least from about 10 weight percent and generally not exceed about 70 weight percent, preferably about 10 to 50 weight percent and most preferably about 10 to 25 weight percent.

In gasoline fuels, other fuel additives may be employed with the additives of the present invention, including, for example, oxygenates, such as t-butyl methyl ether, antiknock agents, such as methylcyclopentadienyl manganese tricarbonyl, and other dispersants/detergents, such as hydrocarbyl amines, hydrocarbyl poly(oxyalkylene) amines, hydrocarbyl poly(oxyalkylene) aminocarbamates, succinimides, or Mannich bases. Additionally, antioxidants, metal deactivators and demulsifiers may be present.

In diesel fuels, other well-known additives can be employed, such as pour point depressants, flow improvers, cetane improvers, and the like.

A fuel-soluble, nonvolatile carrier fluid or oil may also be used with the polyisobutanyl succinimides of this invention. The carrier fluid is a chemically inert hydrocarbon-soluble liquid vehicle, which substantially increases the nonvolatile residue (NVR), or solvent-free liquid fraction of the fuel additive while not overwhelmingly contributing to octane requirement increase. The carrier fluid may be a natural or synthetic oil, such as mineral oil, refined petroleum oils, synthetic polyalkanes and alkenes, including hydrogenated and unhydrogenated polyalphaolefins, and synthetic polyoxyalkylene-derived oils. Such carrier fluids are described, for example, in U.S. Pat. No. 4,191,537 to Lewis, and polyesters, such as those described, for example, in U.S. Pat. Nos. 3,756,793 to Robinson and 5,004,478 to Vogel et al., and in European Patent Application Nos. 356,726, published Mar. 7, 1990, and 382,159, published Aug. 16, 1990.

These carrier fluids are believed to act as a carrier for the fuel additives of the present invention and to assist in removing and retarding deposits. The carrier fluid may also exhibit synergistic deposit control properties when used in combination with a polyisobutanyl succinimides of this invention.

The carrier fluids are typically employed in amounts ranging from about 100 to 5,000 ppm by weight of the hydrocarbon fuel, preferably about 400 to 3,000 ppm of the fuel. Preferably, the ratio of carrier fluid to deposit control additive will range from about 0.5:1 to 10:1, more preferably about 1:1 to 4:1, most preferably about 2:1.

When employed in a fuel concentrate, carrier fluids will generally be present in amounts ranging from about 20 to 60 weight percent, preferably about 30 to 50 weight percent.

EXAMPLES

The following examples are presented to illustrate specific embodiments of this invention and are not to be construed in any way as limiting the scope of the invention.

Example 1

Preparation of

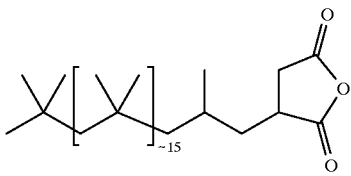

A solution of 27.3 grams of polyisobutenylsuccinic anhydride (0.03 moles, saponification number=107.4, derived from polyisobutene which had an approximate molecular weight of 950 and a methylvinylidene content of 86%) in 150 mL of ethyl acetate and 75 mL of toluene containing 1.4 grams of 10% palladium on charcoal was hydrogenated at 40 psi for 24 hours on a Parr low-pressure hydrogenator. The catalyst was filtered away and the solvent was removed in vacuo to yield the desired polyisobutylsuccinic anhydride.

Example 2

Preparation of

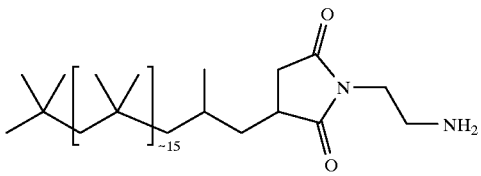

To a flask equipped with a mechanical stirrer, Dean-Stark trap, thermometer, reflux condenser and nitrogen inlet was added 10.2 grams of polyisobutylsuccinic anhydride (0.01 moles) from Example 1. Ethylenediamine (6.5 mL, 0.10 moles) was added dropwise and the mixture was heated to 180° C. for 36 hours to yield 10.4 grams of the desired succinimide as a viscous oil after cooling to room temperature. $^1$H NMR (CDCl$_3$): 0.7–4.0 (m, 146H).

Comparative Example 1

Preparation of

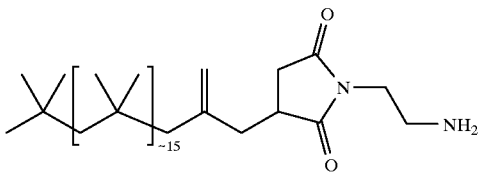

To a flask equipped with a mechanical stirrer, Dean-Stark trap, thermometer, reflux condenser and nitrogen inlet was added 41.2 grams of the polyisobutenylsuccinic anhydride (0.04 moles) employed as the starting material in Example 1. Ethylenediamine (26 mL, 0.10 moles) was added dropwise and the mixture was heated to 180° C. for 36 hours to yield 42.9 grams of the desired succinimide as a viscous oil after cooling to room temperature. $^1$H NMR (CDCl$_3$): 4.8 (m, 2H), 0.7–4.0 (m, 142H).

Example 3

Deposit Control Evaluation

In the following tests, the polyisobutanyl succinimides of the present invention were blended in gasoline and their deposit control capacity tested in an ASTM/CFR Single-Cylinder Engine Test.

In carrying out the tests, a Waukesha CFR single-cylinder engine is used. Each run is carried out for 15 hours, at the end of which time the intake valve is removed, washed with hexane and weighed. The previously determined weight of the clean valve is subtracted from the weight of the valve. The difference between the two weights is the weight of the deposit. A lesser amount of deposit measured indicates a superior additive. The operating conditions of the test are as follows: water jacket temperature 200° F.; manifold vacuum of 12 in. Hg; air-fuel ratio of 12; ignition spark timing of 40° BTC; engine speed is 1,800 rpm; the crankcase oil is a commercial 30W oil. The amount of carbonaceous deposit in milligrams on the intake valves is measured and reported in the following Table I.

TABLE I

| Sample 1[1] | Intake Valve Deposit Weight (in milligrams) | | |
|---|---|---|---|
| | Run 1 | Run 2 | Average |
| Base Fuel | 274.5 | 269.1 | 271.8 |
| Example 2 | 143.0 | | 143.0 |
| Comparative Example 1 | 153.0 | — | 153.0 |

[1]At 50 parts per million actives (ppma) and 50 ppm of α-hydroxy-ω-4-dodecylphenoxypoly(oxypropylene) having an average of 12–13 oxypropylene units (prepared essentially as described in Example 6 of U.S. Pat. No. 4,160,648) carrier oil.

The base fuel employed in the above single-cylinder engine tests was a regular octane unleaded gasoline containing no fuel detergent. The test compounds were admixed with the base fuel to give a concentration of 50 ppma (parts per million actives) and 50 ppm of α-hydroxy-ω-4-dodecylphenoxypoly(oxypropylene) having an average of 12–13 oxypropylene units (prepared essentially as described in Example 6 of U.S. Pat. No. 4,160,648) carrier oil.

The data in Table I illustrate the reduction in intake valve deposits provided by the polyisobutanyl succinimide of the present invention (Example 2), even at a very low concentration.

What is claimed is:

1. A compound of the formula:

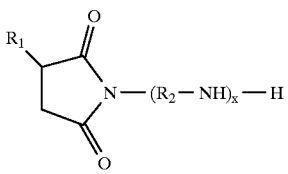

wherein $R_1$ is a polyisobutanyl group derived from a highly reactive polyisobutene having an average molecular weight in the range of from about 500 to 5,000;

$R_2$ is a straight- or branched-chain alkylene group having from about 2 to 6 carbon atoms; and x is an integer from about 1 to 4.

2. The compound according to claim 1, wherein $R_1$ is a polyisobutanyl group derived from a highly reactive polyisobutene having an average molecular weight in the range of from about 500 to 3,000.

3. The compound according to claim 2, wherein $R_1$ is a polyisobutanyl group derived from a highly reactive polyisobutene having an average molecular weight in the range of from about 700 to 3,000.

4. The compound according to claim 3, wherein $R_1$ is a polyisobutanyl group derived from a highly reactive polyisobutene having an average molecular weight in the range of from about 900 to 2,500.

5. The compound according to claim 4, wherein the highly reactive polyisobutene contains at least about 70% of a methylvinylidene isomer.

6. The compound according to claim 1, wherein $R_2$ is an alkylene group having from about 2 to 4 carbon atoms.

7. The compound according to claim 6, wherein $R_2$ is an alkylene group having about 2 or 3 carbon atoms.

8. The compound according to claim 1, wherein x is an integer about 1 or 2.

9. A fuel composition comprising a major amount of hydrocarbons boiling in the gasoline or diesel range and an effective detergent amount of a compound of the formula:

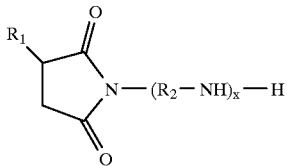

wherein $R_1$ is a polyisobutanyl group derived from a highly reactive polyisobutene having an average molecular weight in the range of from about 500 to 5,000;

$R_2$ is a straight- or branched-chain alkylene group having from about 2 to 6 carbon atoms; and x is an integer from about 1 to 4.

10. The fuel composition according to claim 9 wherein $R_1$ is a polyisobutanyl group derived from a highly reactive polyisobutene having an average molecular weight in the range of from about 500 to 3,000.

11. The fuel composition according to claim 10, wherein $R_1$ is a polyisobutanyl group derived from a highly reactive polyisobutene having an average molecular weight in the range of from about 700 to 3,000.

12. The fuel composition according to claim 11, wherein $R_1$ is a polyisobutanyl group derived from a highly reactive polyisobutene having an average molecular weight in the range of from about 900 to 2,500.

13. The fuel composition according to claim 12, wherein the highly reactive polyisobutene contains at least about 70% of a methylvinylidene isomer.

14. The fuel composition according to claim 9, wherein $R_2$ is an alkylene group having from about 2 to 4 carbon atoms.

15. The fuel composition according to claim 14, wherein $R_2$ is an alkylene group having about 2 or 3 carbon atoms.

16. The fuel composition according to claim 9, wherein x is an integer about 1 or 2.

17. The fuel composition according to claim 9, wherein said composition contains from about 50 to 2,500 parts per million by weight of said compound.

18. A fuel concentrate comprising an inert stable oleophilic organic solvent boiling in the range of from about 150° F. to 400° F. and from about 10 to 70 weight percent of a compound of the formula:

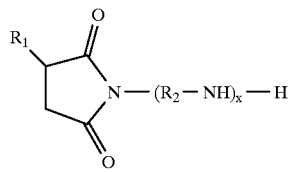

wherein $R_1$ is a polyisobutanyl group derived from a highly reactive polyisobutene having an average molecular weight in the range of from about 500 to 5,000;

$R_2$ is a straight- or branched-chain alkylene group having from about 2 to 6 carbon atoms; and x is an integer from about 1 to 4.

19. The fuel concentrate according to claim 18, wherein $R_1$ is a polyisobutanyl group derived from a highly reactive polyisobutene having an average molecular weight in the range of from about 500 to 3,000.

20. The fuel concentrate according to claim 19, wherein $R_1$ is a polyisobutanyl group derived from a highly reactive polyisobutene having an average molecular weight in the range of from about 700 to 3,000.

21. The fuel concentrate according to claim 20, wherein $R_1$ is a polyisobutanyl group derived from a highly reactive polyisobutene having an average molecular weight in the range of from about 900 to 2,500.

22. The fuel concentrate according to claim 21, wherein the highly reactive polyisobutene contains at least about 70% of a methylvinylidene isomer.

23. The fuel concentrate according to claim 18, wherein $R_2$ is an alkylene group having from about 2 to 4 carbon atoms.

24. The fuel concentrate according to claim 23, wherein $R_2$ is an alkylene group having about 2 or 3 carbon atoms.

25. The fuel concentrate according to claim 18, wherein x is an integer about 1 or 2.

* * * * *